United States Patent
Le Dissez (10) Patent No.: US 8,805,140 B2
(45) Date of Patent: Aug. 12, 2014

(54) METHOD OF CONNECTING USER DEVICES TO OPTICAL FIBRE UNITS CONTAINED IN AN OPTICAL CABLE

(75) Inventor: Arnaud Le Dissez, Milan (IT)

(73) Assignee: Prysmian S.p.A., Milan (IT)

( * ) Notice: Subject to any disclaimer, the term of this patent is extended or adjusted under 35 U.S.C. 154(b) by 789 days.

(21) Appl. No.: 12/867,990

(22) PCT Filed: Mar. 14, 2008

(86) PCT No.: PCT/IT2008/000170
§ 371 (c)(1),
(2), (4) Date: Dec. 3, 2010

(87) PCT Pub. No.: WO2009/113112
PCT Pub. Date: Sep. 17, 2009

(65) Prior Publication Data
US 2011/0081121 A1    Apr. 7, 2011

(51) Int. Cl.
*G02B 6/44*    (2006.01)
(52) U.S. Cl.
CPC ............ *G02B 6/4475* (2013.01); *G02B 6/4441* (2013.01); *G02B 6/4466* (2013.01)
USPC ........... 385/100; 385/102; 385/104; 385/105; 385/106
(58) Field of Classification Search
None
See application file for complete search history.

(56) References Cited

U.S. PATENT DOCUMENTS

| | | | |
|---|---|---|---|
| 5,394,502 A | 2/1995 | Caron | |
| 6,493,500 B1 * | 12/2002 | Oh et al. | 385/135 |
| 8,582,938 B2 * | 11/2013 | Cody et al. | 385/100 |
| 2002/0064364 A1 | 5/2002 | Battey et al. | |

FOREIGN PATENT DOCUMENTS

| | | |
|---|---|---|
| DE | 298 00 885 U1 | 4/1998 |
| EP | 0 428 931 A2 | 5/1991 |
| FR | 2 901 890 | 12/2007 |
| WO | WO-2006/136558 A1 | 12/2006 |
| WO | WO-2008/008115 A2 | 1/2008 |

OTHER PUBLICATIONS

International Search Report from the European Patent Office for International Application No. PCT/IT2008/000170 (Mail date: Nov. 25, 2008).

* cited by examiner

*Primary Examiner* — Tina Wong
(74) *Attorney, Agent, or Firm* — Finnegan, Henderson, Farabow, Garrett & Dunner, L.L.P.

(57) ABSTRACT

A method for connecting user devices to optical fiber units contained in an optical cable includes: providing an opening in a sheath of the optical cable to access the optical fiber units contained in the optical cable; extracting a segment of at least one optical fiber unit from the optical cable through the opening; inserting a free end of the extracted segment of optical fiber unit into a protection tube; making the protection tube slide on the extracted segment of optical fiber unit to insert an end portion of the protection tube, distal from the free end of the extract segment of the optical fiber unit, into the optical cable through the opening; positioning a closure element on the optical cable in correspondence of the opening so as to substantially realize a closure thereof; securing in a removable way the closure element to the optical cable and bringing the free end of the extracted segment of optical fiber unit in correspondence of a connection point of a user device.

10 Claims, 5 Drawing Sheets

METHOD OF CONNECTING USER DEVICES TO OPTICAL FIBRE UNITS CONTAINED IN AN OPTICAL CABLE

CROSS REFERENCE TO RELATED APPLICATION

This application is a national phase application based on PCT/IT2008/000170, filed Mar. 14, 2008, the content of which is incorporated herein by reference.

BACKGROUND OF THE INVENTION

1. Field of the Invention

The present invention relates in general to the field of fiber optic communications, and particularly to the aspects related to the deployment of cablings for the connection of user devices to optical networks.

2. Discussion of the Related Art

The deployment of broadband communications networks also calls for using optical fibers for the so-called "last mile", i.e. the last trunk of the communications network to which the user devices, like for instance modems, set-top boxes for receiving cable television services, IP (Internet Protocol) phones and similar devices, are directly connected.

Typically, the deployment of the last mile of an optical network provides for posing in the field optical cables containing a plurality of optical fibers, for instance in a number variable from 6 to 48; the cables are routed through conduits that can for example develop through or along the walls of a multi-floor building, often for more or less vertical segments, or, in the case of residential zones with houses set in succession along a city street, the optical cables extend horizontally through conduits preferably located under of the ground level.

Typically, an optical cable of the type adapted for this use includes a tubular element, or sheath, inside which several optical fibers are placed. Depending on the specific type of application, the optical fibers can be accommodated within the sheath without protections, or they may be covered by a protective coating, or they may also be gathered in independent groups (also referred to as microcables or micromodules) contained in a thin tubular coating. In the following, where not otherwise specified, such combinations of optical fibers are defined as "optical fiber units".

In order to make the connection of the different user devices to the optical network possible, it is necessary to lead one or more optical fibers to the sites (apartments, houses, offices) of the users. To this end, openings need to be to made in the sheaths of the optical cables, so as to be able to access the optical fibers accommodated within each cable; through such openings, the optical fibers can be at least partially drawn out, extracted from the cable and routed to where needed, for example to sockets provided for in the premises of the users, to which the respective devices can be connected.

A similar cabling method is described, for instance, in the International application No. WO 2006/136558, according to which in the sheath of an optical cable containing several optical microcables two openings are made, a first opening in correspondence of the point at which the cabling for the connection of a subscriber has to be realized, and a second opening downstream thereof, at a distance of the order of about some meters or tens of meters from the first opening; one of the optical microcables contained in the optical cable is selected (for example based on its color) and cut in correspondence of the second opening, and the segment of microcable between the first opening and the point of cut is then extracted from the optical cable through the first opening. The extracted microcable segment is then inserted into a pre-installed microconduit that extends to the connection point of the subscriber, or, depending on the circumstance, to a branch box.

It often happens that the optical cable has to be passed through conduits already existing in the buildings, originally intended to contain other types of cables, for instance for the distribution of electric energy and/or of television and/or telephone signals, and that the extraction from the cable of the optical fibers for the connection to the different user devices has to be made in correspondence of already present branch boxes. This is for example the case where optical fibers have to be deployed in buildings built in relatively remote times. The branch boxes, serving for a plurality of purposes, are in such cases accessible to technical personnel of disparate nature, for instance operators of the electric energy distribution network or of the telephone company, or people entrusted with the maintenance of the building, and this constitutes a risk factor for the integrity of the optical fibers, which, as known, are relatively delicate structures, and their manipulation should be allowed only to specialized personnel. Additionally, the branch boxes can result particularly crowded with cables of disparate nature. Pressures and undue crushing of the optical fibers in consequence of the access to the branch box, particularly made even more likely by the non-careful behavior of technicians that are not accustomed to handling optical fibers, can cause damages to the optical cable, particularly to the optical fibers extracted therefrom for the connection of the users, as well as of the optical fibers that remain partially exposed in correspondence of the openings made in the cable for the extraction of the fibers.

In the International application No. WO 2008/008115 the use is described of a transition tube in flexible material for the protection of an optical fiber extracted from an optical cable through an access location, as well as the use of a cap to close again the access location and to protect the remaining fibers present in the cable. After having extracted the fiber from the optical cable, the transition tube is inserted thereon, up to partially push it within the same optical cable; the cap is then placed to close the access location, and the cap is attached in a non-removable way to the optical cable through adhesive or similar. After having made the junction ("splice") of the fiber extracted from the cable to a section of connection fiber (also referred to as "pigtail"), a sleeve in thermo-retractable material is finally put on the optical cable that seals both the zone of extraction of the optical fiber from the cable, and the zone of junction ("splice") between the fibers.

Such operation, that involves head-to-head splicing of the fibers, is performed in factory, in a controlled environment.

SUMMARY OF THE INVENTION

When operations of extraction of optical fibers from cables are to be performed in the field, the Applicant has perceived the necessity of protecting against possible damages both the optical fibers present in the cables, including those that are extracted from the cable to accomplish the connection of the various user devices, and of the remaining optical fibers that remain exposed in correspondence of the openings made in the sheath of the cable for the extraction of the fibers, as well as of making possible the extraction from the cable of further optical fibers in subsequent times, exploiting the openings already made in the sheath of the cable, without the necessity of having to make new openings. The Applicant has, in fact, observed that the limited dimensions of the branch boxes generally do not allow to make, in subsequent times, more openings in the sheath of an optical cable in order to extract from the cable more fibers in different times, an operation that is for instance necessary when new users request the connection to the optical network.

The Applicant has therefore faced the problem of how to provide a suitable protection of the optical fibers extracted from an optical cable, typically already installed in the field, in such a way as to make the interventions on the optical cable performed in subsequent times as easy as possible, for instance for the extraction of further fibers, the access to which is made necessary in a second, subsequent time after the first installation.

The Applicant has found that a solution to the problem outlined above includes protecting and guiding the fiber or fibers extracted from the optical cable inserting them, at least for their segment that otherwise would result exposed at the outside of the cable, within a protection tube of suitable characteristics, and at the same time protecting the other optical fibers present in the cable by applying in a removable way a coverage to the optical cable in correspondence of the opening made therein for the extraction of the optical fiber or fibers.

Particularly, the use of the protection tube allows to avoid—or however it makes less probable—that the optical fiber or fibers extracted from the cable are subject to excessively marked bending, an event that, should it occur, could cause the damage—up to the breaking—of the optical fiber, jeopardizing its performance.

The Applicant has additionally found that the protection tube—adapted to protect and guide the optical fibers contained therein externally to the cable—should be resistant to the phenomenon of "kinking", i.e. the protection tube should advantageously be realized in a material capable of withstanding abrupt bents or kinks, the occurrence of which would inevitably affect in negative way the optical fiber accommodated in the tube itself. The Applicant has thus perceived that the protection tube should ensure that the optical fiber contained therein is arranged according to a path that is as regular as possible and without sudden and abrupt discontinuities. In fact, should the protection tube be subject to the phenomenon of kinking, this would in general have a negative impact on the optical fiber, with the formation, for instance, of an excessively marked bend or even the breakage of the fiber itself, with consequent attenuation or interruption of the signal it transports.

The Applicant has moreover perceived the criticality of the dimensions of the protection tube, especially in view of the fact that it should be possible to accommodate a number of protection tubes higher than one, typically from two to four, in the same opening realized in the sheath of the cable, so as to allow the connection of a plurality of users through optical fibers extracted by the same opening of the cable. Particularly, the Applicant has perceived that the inner diameter of the protection tube has to be sufficiently large to enable the sliding of the optical fiber inside it, up to some meters of length, and, at the same time, its outer diameter should be sufficiently small to enable the introduction of one or more tubes inside the above-mentioned opening without causing a crushing of the remaining fibers present in the cable and without excessively hindering the sliding thereof inside the cable.

According to an aspect of the present invention, a method of connection of user devices to optical fiber units contained in an optical cable is provided, the method comprising:

providing an opening in a sheath of the optical cable to access the optical fiber units contained in the optical cable;

extracting a segment of at least one optical fiber unit from the optical cable through said opening;

inserting a free end of the extracted segment of optical fiber unit into a protection tube;

making the protection tube slide on the extracted segment of optical fiber unit to insert a first end portion of the protection tube, distal from the free end of the extracted segment of the optical fiber unit, into the optical cable through said opening;

positioning a closure element on the optical cable in correspondence of said opening so as to realize a substantial closure thereof;

securing in removable way the closure element to the optical cable, and bringing the free end of the extracted segment of optical fiber unit in correspondence of a connection point of a user device.

To provide the opening, a portion of sheath of the optical cable needs to be removed. Advantageously, the removed portion of sheath is reused as a closure element of the opening.

Preferably, the closure element is secured in removable way to the optical cable using at least one fastener.

The at least one fastener is preferably also used for securing the protection tube to the sheath of the optical cable, so as to keep in position the protection tube and the optical fiber unit contained therein.

To extract the segment of the at least one optical fiber unit from the optical cable through said opening it is possible to:

providing a further opening in the sheath of the optical cable in a position downstream said opening, to access the optical fiber units contained in the optical cable;

cutting the at least one optical fiber unit in correspondence of said further opening; and extracting from the opening a portion of the at least one optical fiber unit comprised between said opening and said further opening.

In this way, it is possible to reduce the length of the segment of optical fiber unit to be extracted from the cable.

To bring the free end of the segment of optical fiber unit extracted from the optical cable in correspondence of a connection point of a user device, the extracted segment of optical fiber unit is preferably inserted into a user conduit, in which also a second end portion of the protection tube, i.e. the end of the protection tube proximal to the free end of the extracted segment of the optical fiber unit is preferably inserted.

With the term "user conduit" it is intended to mean a conduit intended to accommodate therewithin the optical fiber unit extracted from the cable and to guide it to the user connection point. Typically, the user conduit accomplishes the connection between the optical cable (from which the optical fiber unit has been extracted) and the user device or a branch box in proximity of the user interested in the connection.

According to a further embodiment, the user conduit is secured in removable way to the sheath of the optical cable, for instance through the at least one fastener used for securing in removable way the closure element to the optical cable.

The protection tube is realized in flexible material, preferably polytetrafluoroethylene (PTFE) or polybutiltherephtalate (PBT), and it has an outer diameter ranging from approximately 10% and approximately 20%, preferably from approximately 12% and approximately 17%, of the inner diameter of the sheath of the optical cable. In this way, it is guaranteed that the insertion of the end portion of the protection tube into the optical cable does not compress the optical fiber units contained therein, leaving them relatively loose so as to allow the extraction of further optical fiber units, in correspondence of the same opening or in successive openings formed downstream the latter.

BRIEF DESCRIPTION OF THE DRAWINGS

These and other features and advantages of the present invention will be made evident by the following detailed description of its possible embodiments, provided merely by way of non-limitative examples in the attached drawings, wherein.

DETAILED DESCRIPTION OF EMBODIMENTS OF THE PRESENT INVENTION

Figure 1:
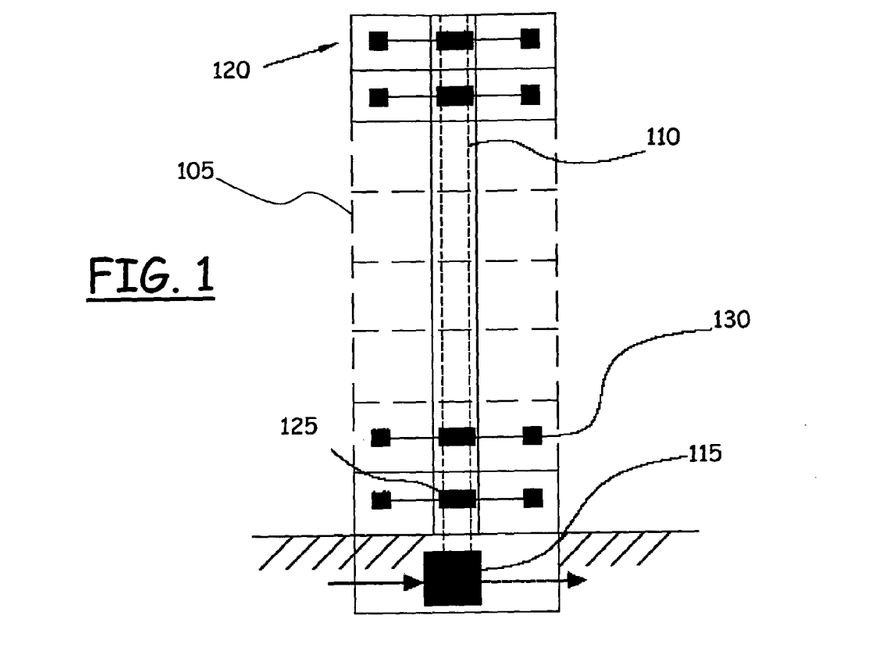
FIG. 1 schematically shows a possible scenario where the present invention is advantageously applicable.

Making reference to the drawings, in FIG. 1 there is schematically shown a possible scenario where the present invention is advantageously usable.

Particularly, the scenario considered in FIG. 1 relates to the connection to an optical communications network of a multi-floor building 105, for instance a palace, in which several potential users to be connected to the optical network reside. The users can for instance be private individuals or offices. It is underlined that a similar scenario is merely exemplary and not limitative; other scenarios of use of the solution according to the present invention are in fact possible, for instance for the connection to an optical network of residential zones with houses of individual users generically aligned along one or more city streets.

An optical cable 110 (in this context of vertical development the optical cable 110 is in jargon referred to as a "riser" cable) is installed in the building 105 and it extends vertically starting from a distribution box 115, generally located in correspondence of the foundations of the building 105, for instance in a basement, or at the level of the sidewalk, up to the top of the building 105, in correspondence of the highest floor 120 thereof.

In correspondence of each floor of the building 105 at least one branch box 125 is provided for, for the branching of the optical fibers necessary for the connection of respective user devices 130 of users occupying the apartments of the building located at that floor. The user devices 130 can for instance include modems, set-top boxes for cable TV (for instance IPTV—Internet Protocol TeleVision), IP phones and similar devices.

In different application scenarios, such as for instance in case it is desired to realize the connection to the optical network of houses aligned along a city street, the optical cable 110, rather than extending vertically, extends substantially horizontally, running substantially in parallel to the houses, for instance being buried under the sidewalk, and the branch boxes 125 are placed in correspondence of each house to be connected to the network.

Figure 2:
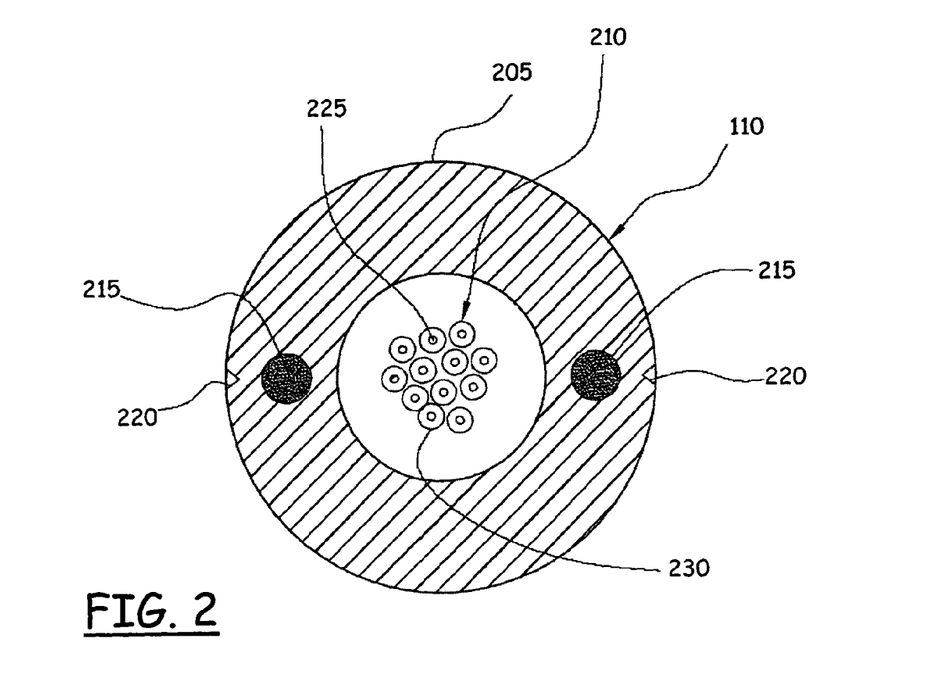
FIG. 2 schematically shows, in transversal section, an example of optical cable usable in the scenario of FIG. 1.

In FIG. 2 there is schematically shown by way of non-limitative example the structure of the optical cable 110. The optical cable 110 includes a tubular sheath 205, for instance in polymeric material, that accommodates in its inner hollow space, in relatively loose way, a plurality of optical fiber units 210, for instance in a number ranging from among 6 and 48, depending on the type of optical cable and on the number of users to be connected to the optical network. Two reinforcement elements 215 are embedded in the material of the sheath 205 and extend longitudinally to the cable, in substantially diametrically opposite positions; the reinforcement elements 215 can be for instance bars of polymeric material (typically a resin) loaded with glass fibers ("Glass Reinforced Polymer" or GRP) or with aramyd fibers. In the external surface of the sheath 205 two longitudinal grooves 220 are preferably formed, each located in correspondence of a respective reinforcement element 215, useful to allow the personnel entrusted with the operations of installation of the cable and connection of the users to identify the position of the reinforcement elements 215, so as to avoid to cut the latter in the procedure of extraction of the optical fiber units 210 for the connection of the user devices 130, as will be described in detail in the following.

Each optical fiber unit 210 includes an optical waveguide 225, constituted by an optically transmissive core, surrounded by a cladding; core and cladding are preferably constituted by silica-based material, and the material of the cladding has a refraction index lower than the refraction index of the material of the core, for substantially confining the optical radiation within the core. The optical waveguide 225 is preferably covered by at least one protective coating layer ("coating"); typically two protective coating layers are present: the first coating layer ("primary coating") is in direct contact with the optical waveguide 225, while the second coating layer ("secondary coating") covers the primary coating. The coating layers can be colored by means of suitable inks for an easier identification of the different optical fiber units 210 accommodated within the optical cable 110. The optical waveguide 225 with its primary and secondary coating layers is usually called "optical fiber".

A buffer layer 230 covers the optical fiber to complete the optical fiber unit 210. The buffer layer 230 can be substantially in contact with the secondary coating ("tight buffer") or it can consist of a small tube of inner diameter somehow larger than the outer diameter of the secondary coating ("loose buffer"); the outer diameter of the optical fiber unit 210 can for instance vary from about 600 μm to about 900 μm, other diameters, larger or smaller, being however possible.

The dimensions of the optical cable 110 can depend on the outer diameter and on the number of optical fiber units 210 that it is intended to accommodate; for instance, considering optical fiber units 210 of diameter of 900 μm, an optical cable 110 containing 12 optical fiber units 210 may have an inner diameter of about 5 mm and an outer diameter of about 9 mm, an optical cable intended to contain 24 optical fiber units may have an inner diameter of about 7 mm and an outer diameter of about 12 mm, while an optical cable intended to contain 48 optical fiber units may have an inner diameter of about 9.5 mm and an outer diameter of about 14.5 mm.

In the following, with the aid of FIGS. 3-7, a method according to embodiments of the present invention for the connection of the user devices 130 to the optical network will be described.

Figure 3:
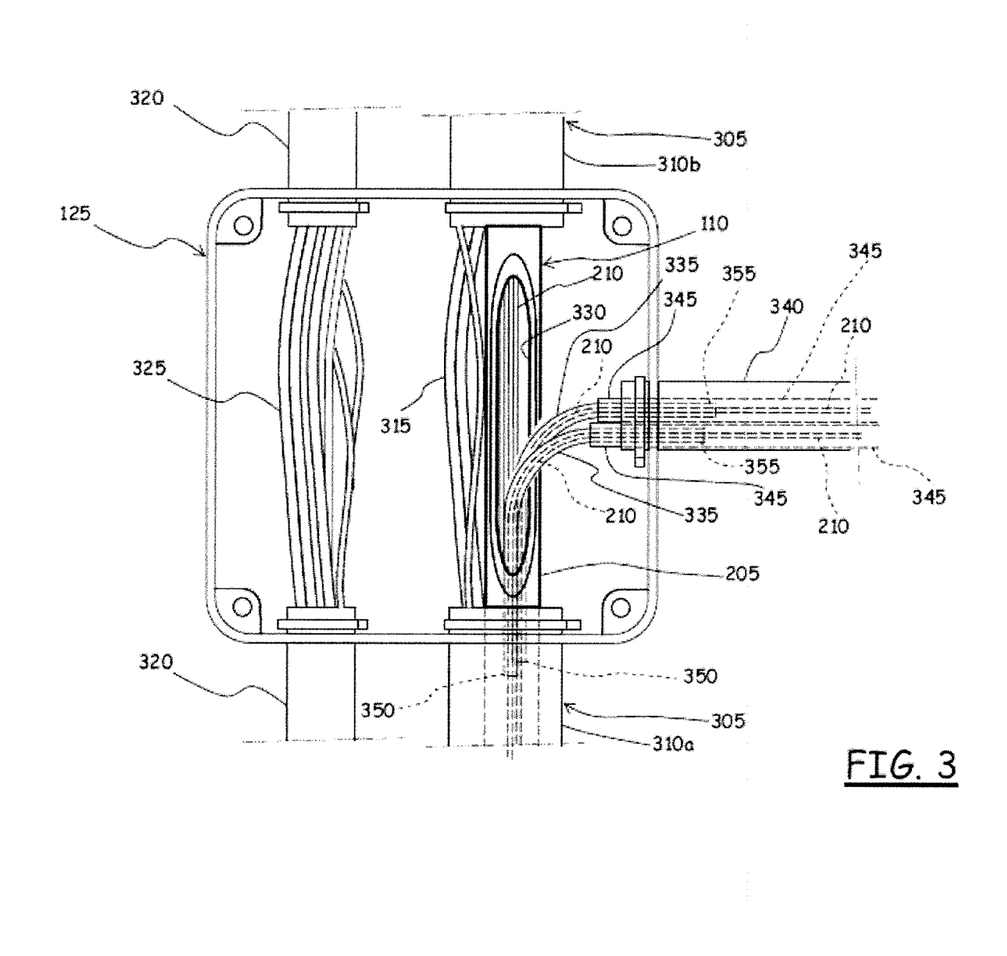
FIG. 3 schematically shows a branch box in correspondence of which optical fiber units are extracted from an optical cable of the type shown in FIG. 2, for the connection of user devices, according to a method in accordance with an embodiment of the present invention.

Particularly, in FIG. 3 one of the branch boxes 125 of FIG. 1 is schematically shown, in correspondence of which one or, in general, some, and particularly two, as in the presented example, of the optical fiber units 210 present in the optical cable 110 is/are extracted from the cable to realize the connection of one or more respective users of the building 105. The branch box 125 substantially consists of a box-shaped enclosure, of generically rectangular or square shape, open at the top and provided with a closure cover, not shown in the drawings for greater clarity, attachable to the box-shaped enclosure by means of screws or similar. Typical dimensions of the branch box 125 can be 100 mm×100 mm×50 mm.

The optical cable 110 extends through the building 105 being preferably inserted in a conduit 305, for instance made of flexible corrugated tubes 310a, 310b, of typical diameter variable between 20 mm and 32 mm, that terminate inside the branch box 125 through openings provided in the side walls thereof. As schematized in the drawings, inside the same conduit 305, in addition to the optical cable 110, also other types of cables can pass, denoted altogether with 315, for instance cables of distribution of the electric energy, or coaxial cables for the distribution of the television signal, connected to an analog or digital receiver (not shown in the drawings), for instance a satellite receiver, telephone duplex cables, or also other types of cables; this is a rather typical situation, especially in the case of connection to an optical network of buildings built in remote times, in which case in order to draw the optical cables it is expedient or essentially unavoidable to exploit already existing conduits, canalizations, passages, so that masonry works are for instance not required. As shown in the drawings, further conduits 320 can also arrive at the branch box 125, within which further cables 325 pass, also of the most disparate nature. The inner space of the branch box 125, relatively limited, is therefore rather crowded by the presence of a variety of different cables, and, therefore, often technical personnel not trained to the manipulation of optical fibers cables has access to it, like for instance electricians, operators of the electric energy distribution company or of the telephony companies.

Assuming that the connection to the optical network of a user located at a certain floor of the building 105 is to be accomplished, according to an embodiment of the present invention, the technician proceeds in the following way.

Firstly, it removes the cover of the branch box 125 located at the floor of the building 105 at which the user to be connected to the optical network resides, to gain access to the inner space of the box 125.

Then the technician identifies the optical cable 110 inside the branch box 125, and, using a suitable tool, he/she makes a cut in the sheath 205 of the optical cable 110, removing a portion or slice thereof, to realize an opening 330 in the sheath 205 of the optical cable 110 and to gain access to the optical fiber units 210 accommodated within the sheath 205 (having care not to cut the reinforcement elements 215). The opening 330 made in the sheath 205 of the optical cable 110 has dimensions sufficient to allow the technician to identify the optical fiber units 210 inside the optical cable 110 and to extract from the sheath 205 one or more optical fiber units 210, two in the herein considered example, as described in following. To realize the opening 330 in the sheath 205, the technician can use any tool adapted to the purpose, for instance a blade of a knife or a scissor.

Once the opening 330 is made and the optical fiber units 210 to be used for the connection of the users are identified within the optical cable 110, for instance through the color, the technician proceeds to the extraction of the optical fiber units 210 by unsliding them out of the sheath 205 of the optical cable, until the free ends of the optical fiber units 210 are extracted from the opening 330.

With the purpose of avoiding the necessity to extract relatively long segments of optical fiber unit (the segment to be extracted depending in the general on the length of the riser cable 110, and therefore, in the example of FIG. 1, on the height of the building 105, and on the floor of the building at which the premises of the users to be connected are located), advantageously the technician can go to an upper floor of the building 105, for instance a floor located at about one or two tens of meters from the floor at which the premises of the users to be connected are located, and access the branch box located at such upper floor; once the branch box 125 is opened, the technician identifies the optical cable 110, makes in the sheath 205 thereof another cut and removes a portion thereof to realize an opening similar to the opening 330; having identified (for example, based on the color) the optical fiber units 210 that needs to be extracted at the lower floor of the building, the technician cuts them. Returning to the floor of the building 105 at which the premises of the users to be connected are placed, the technician can then pick the optical fiber units 210 that have been cut at the upper floor and extract them from the sheath 205 of the optical cable 110. In this way, the segment of optical fiber unit 210 that needs to be extracted from the cable 110 advantageously results relatively short.

Once extracted the optical fiber units 210 from the sheath 205 of the optical cable 110, the technician inserts on the free end of each of the extracted optical fiber units a respective protection tube 335, making then it slide along the whole segment of optical fiber unit 210 extracted from the sheath 205 of the optical cable 110, until the protection tube 335 is brought in correspondence of the opening 330. The free ends of the extracted optical fiber units 210 are then inserted into conduit 340, for instance a corrugated tube, that starts from the branch box 125 (terminating in the inner space thereof through an opening provided in one of its two side walls adjacent to those through which the conduits 305, 310 pass) and extends to the premises of the user to be connected to the optical network, or, in case the users to be connected are more than one, to a further branch box (not shown), from which the optical fiber units of each user are for instance routed to a respective optical network connection socket (not shown in the drawings) located in the premises of the user. Preferably, the free end of each optical fiber unit 210 extracted from the cable 110 is inserted into and made to slide within a user conduit 345 accommodated within the corrugate tube 340 and that partially protrudes from the latter inside the branch box 125, extending within the corrugated tube 340 to the connection socket.

Particularly, the protection tube 335 is realized in flexible material, preferably having low friction coefficient, sufficiently resistant to avoid to undergo to pronounced bents, to protect the optical fiber unit 210 from the phenomena of kinking mentioned in the foregoing; suitable materials can be PTFE or PBT.

The protection tube 335 is long enough to allow the partial insertion of one 350 of its ends into the sheath 205 of the optical cable 110, passing through the opening 330, for a segment that can for instance have length equal to 5-10 mm, and at the other end 355 into the user conduit 345, for instance for a segment of similar length, as shown in FIG. 3.

Figure 8:
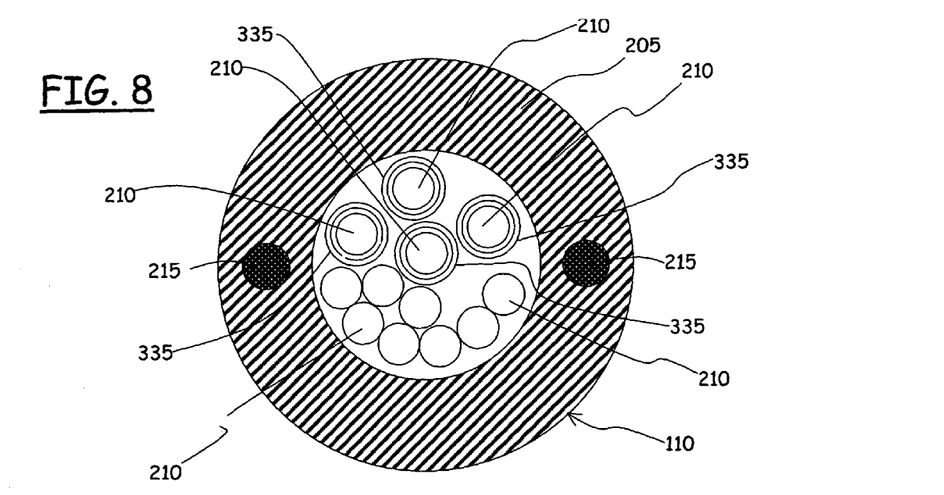
FIG. 8 is a schematic view in transversal section of an exemplary optical cable containing 12 optical fiber units, with inserted therein four protection tubes of optical fiber units extracted from the cable.
Figure 9:
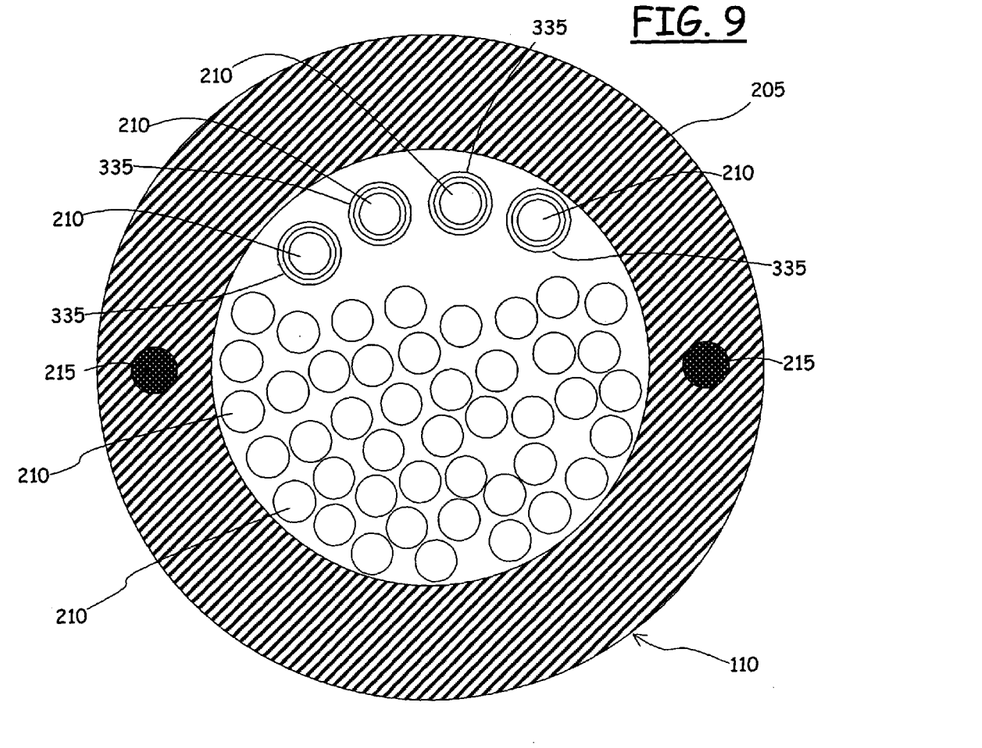
FIG. 9 is a schematic view, in transversal section, of an exemplary optical cable containing 48 optical fiber units, with inserted therein four protection tubes of optical fiber units extracted from the cable.

The protection tube 335 has an inner diameter sufficiently large to allow an easy sliding on the respective segment (of about some meters or tens of meters) of optical fiber unit 210 that is extracted from the optical cable 110; however, since the available space inside the sheath 205 of the optical cable 110 is generally limited, and additionally, as in the herein considered example, it can be necessary to insert into the sheath 205 of the optical cable 110, through the same opening 330, two (or also more) protection tubes 335, to realize the connection of two or more corresponding users located at the same floor of the building 105 (typically up to a maximum of four distinct users), the overall dimensions of the protection tube 335, determined by its outer diameter, should be as small as possible, also to avoid that, following the insertion of the protection tube 335 within the sheath 205, the optical fiber units 210 accommodated therein are damaged or considerably compressed, preventing as a result an easy sliding thereof, necessary instead for their extraction from the sheath during the connection of other uses, located for instance upstream (i.e., at lower floors of the building 105) of the point of insertion of the protection tube 335 into the sheath 205. For instance, the outer diameter of the protection tube 335 can range from about 10% to about 20% of the inner diameter of the sheath 205 of the optical cable, and preferably from about 12% to about 17%. In other words, the relationship between the area occupied by the protection tube (external area) and the available area inside the sheath 205 of the optical cable 110 is preferably in the range from about 1.2% and 9.0%. For instance, in the case of optical fiber units with a diameter of 900 μs, the protection tube 335 can have an inner diameter of about 1.14 mm and an outer diameter of about 1.37 mm; with optical fiber units of different, for instance smaller, diameter, a protection tube with different, for instance smaller dimensions can be used. The transversal sections of the optical cable 110 schematically shown in FIGS. 8 and 9 represent two embodiments in which, also after the insertion of four protection tubes 335 into the sheath 205 of the optical cable 110, the remaining optical fiber units 210 result sufficiently loose within the sheath 205. Particularly, the example of FIG. 8 relates to the case of an optical cable 110 containing 12 optical fiber units and having an inner diameter of about 5 mm and an outer diameter of about 9 mm, while the example of FIG. 9 relates to the case of an optical cable containing 48 optical fiber units, with inner diameter of about 9.5 mm and outer diameter of about 14.5 mm.

Figures 4, 5:
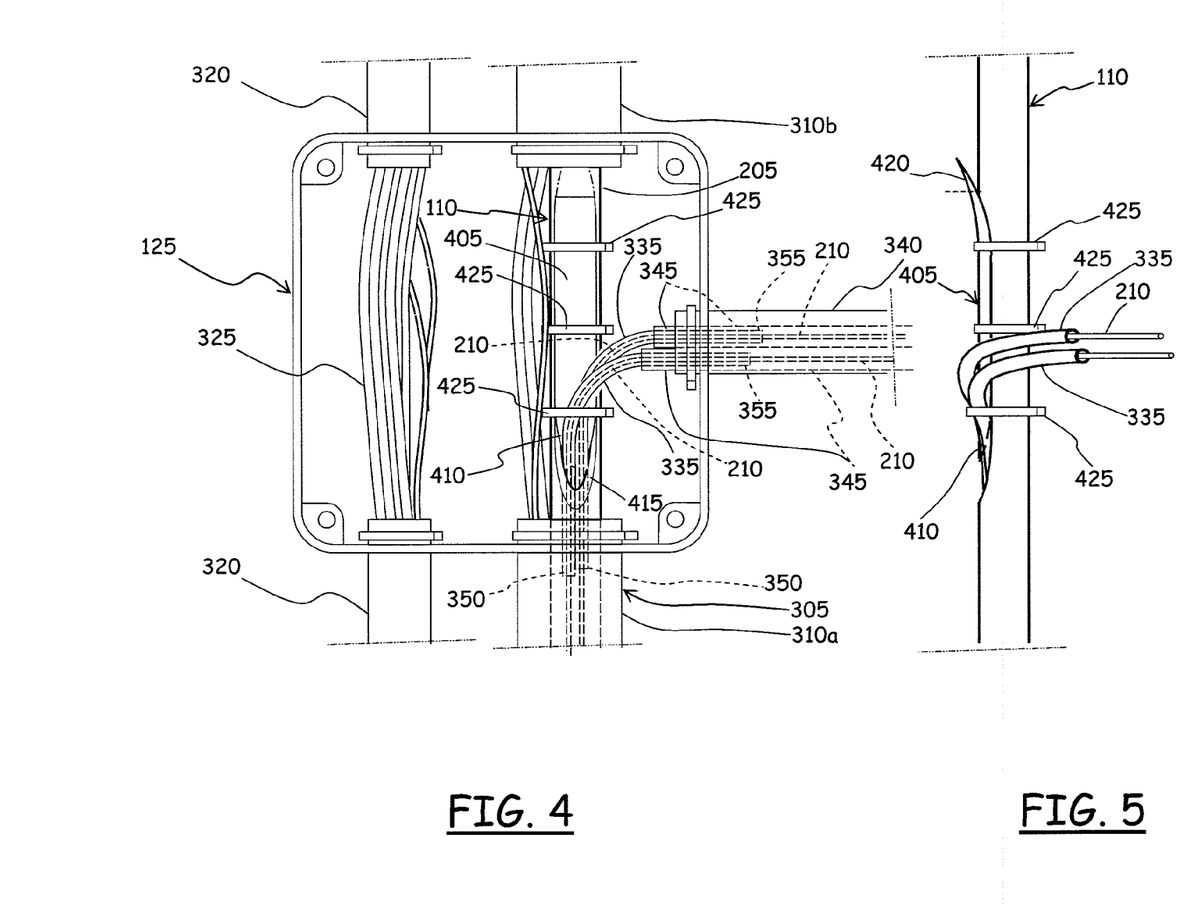
FIG. 4 schematically shows the branch box of FIG. 3, in a subsequent phase of the connection method.
FIG. 5 is a lateral view of the optical cable visible in FIG. 4.

After having inserted the optical fiber unit 210 into the tube 340, the technician proceeds to re-close the opening 330 to protect against accidental damages also the remaining optical fiber units 210 present in the optical cable 110. To such purpose, according to an embodiment of the present invention, the technician can advantageously use the removed portion of sheath 405 that had previously been removed from the optical cable 110 to realize the opening 330. As shown in FIGS. 4 and 5, the removed portion 405 of sheath is brought close to the external surface of the optical cable 110, in correspondence of the opening 330, preferably slightly above of the point of entrance of the protection tube 335 into the sheath 205, so that a lower edge 410 of the removed portion 405 of sheath is inserted amidst the protection tube 335 and the external surface of the sheath 205 of the optical cable; making the removed portion 405 of sheath slide downward along the sheath as far as possible (until the presence of the protection tube 335 allows), the opening 330 is substantially closed, exception made for a small region located in proximity of the lower end 415 of the opening 330; the part of the removed portion 405 of sheath in excess in correspondence of its upper end 420 remains, as shown in FIG. 5, overlapping the sheath 205 of the optical cable 110, without causing significant space occupation, also thanks to the beveled profile possessed by the removed portion 405 of sheath in correspondence of both of its ends 410, 420.

The removed portion 405 of sheath is then finally secured to the sheath 205 of the optical cable 110 through suitable securing means adapted to enable its subsequent removal, for making it possible to re-gain access to the opening 330 in case of necessity; for this purpose, one or more fasteners 425 may for example be used, for instance, as shown in the drawings, three fasteners 425, arranged in longitudinal succession in three different positions of the removed portion 405 of sheath; preferably, at least one of the fasteners 425, particularly the lower one, also secures the protection tube 335, binding it to the sheath 205 of the optical cable 110. In alternative to the fasteners 425, the technician can use an adhesive ribbon or other securing means that allows an easy removal of the removed portion 405 of sheath after the first operation of connection of the floor.

In a similar way, the technician proceeds to re-close the opening realized in the sheath of the optical cable in correspondence of the branch box situated some floors of the building 105 above the floor at which the optical fiber unit 210 has been extracted, where the latter had previously been cut.

It can be appreciated that in this way a re-openable closure of the openings made in the optical cable for the extraction of the optical fiber units 210 is achieved, with the double advantage that the optical fiber units present in the optical cable 110 are protected against accidental damages, and that the openings already made in the past in the cable can be reused to perform subsequent interventions, for instance to extract further optical fiber units in case new users have to be connected. In such a case, the technician has simply to remove the fasteners 425 and to remove the removed portion 405 of sheath that covers the opening 330.

The adoption, as closure element of the opening 330, of the removed portion 405 of sheath removed for realizing the opening is to be construed as purely exemplary and not limitative; other means could be used for realizing the re-openable closure of the opening 330, for instance caps in polymeric material having a compatible shape substantially with the dimensions of the opening. However, the use of the removed portion 405 of sheath results particularly advantageous inasmuch it has exactly the same dimensions of the opening to be re-closed and, as mentioned above, since it is thinned at its ends (the thickness decreases in correspondence of the ends 410 and 420), it facilitates its matching with the edges of the opening 330.

Figure 6:
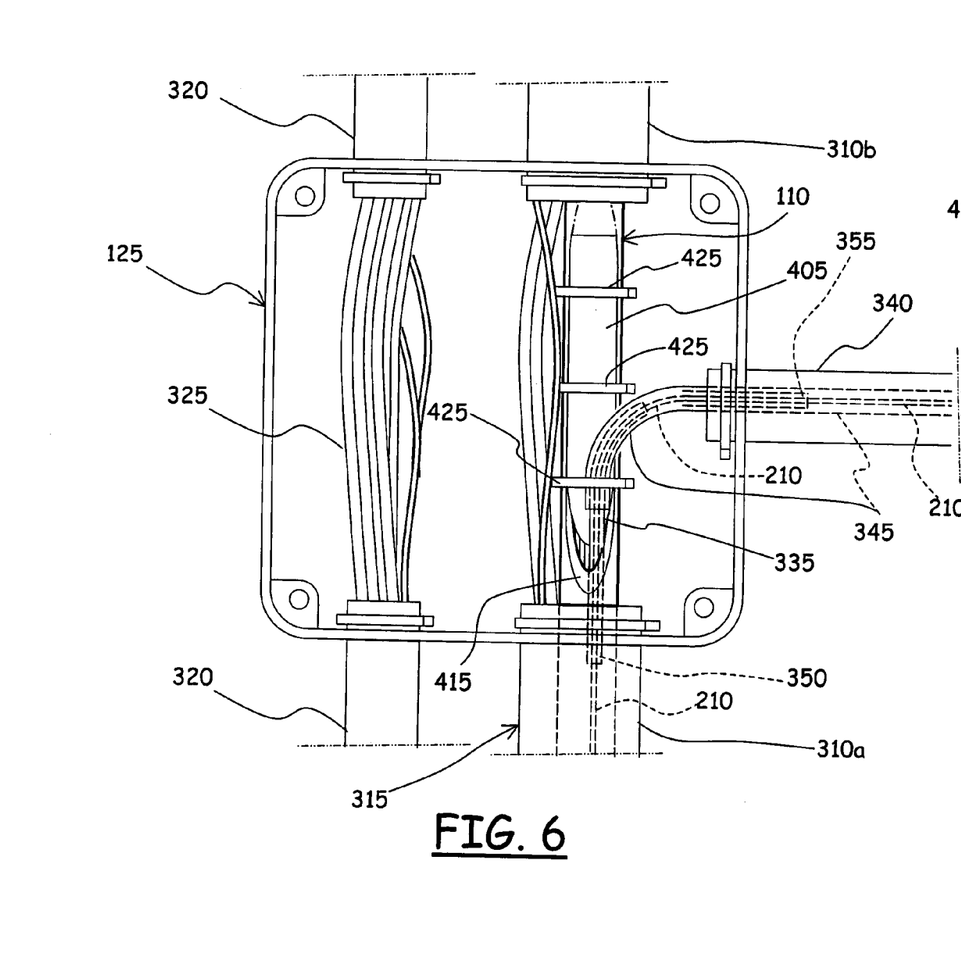
FIG. 6 schematically shows the branch box of FIG. 3, in a subsequent phase of a connection method according to a variant of the embodiment of the present invention.
Figure 7:
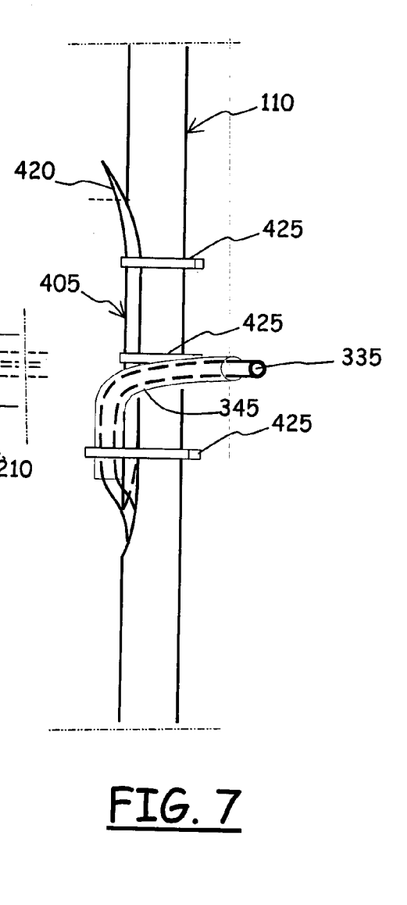
FIG. 7 is a lateral view of the optical cable visible in FIG. 6.

In FIGS. 6 and 7 a variation of the above embodiment is depicted (in the exemplary assumption, adopted not to complicate the drawings, but not limitative for the purposes of the present invention, of extraction of only one optical fiber unit from the optical cable), in which a segment of the user conduit 345—protruding out of the corrugated tube 340—is brought close to the lower end 415 of the opening 330, subsequently secured to the optical cable 110 for instance by means of one or more of the fasteners 425 used for securing the removed portion 405 of sheath on the opening 330. In this way, the optical fiber unit 210 that is extracted from the optical cable 110 to accomplish the connection with a user device 130 advantageously results even more protected against accidental damages, being, for his segment that goes from the optical cable 110 to the corrugated tube 340, inserted both in the protection tube 335 and in the user conduit 345.

The invention claimed is:

1. A method of connection of user devices to optical fiber units contained in an optical cable, comprising:

providing an opening in a sheath of the optical cable to access the optical fiber units contained in the optical cable, wherein providing an opening comprises removing a portion of sheath of the optical cable;

extracting a segment of at least one optical fiber unit from the optical cable through said opening;

inserting a free end of the extracted segment of optical fiber unit into a protection tube;

making the protection tube slide on the extracted segment of optical fiber unit up to insert a first end portion of the protection tube, distal from the free end of the extracted segment of the optical fiber unit, into the optical cable through said opening;

positioning a closure element on the optical cable in correspondence of said opening so as to realize a substantial closure thereof, wherein positioning a closure element on the optical cable comprises repositioning the removed portion of sheath;

securing in a removable way the closure element to the optical cable; and bringing the free end of the extracted segment of optical fiber unit in correspondence of a connection point of a user device.

2. The method of claim 1, wherein securing in a removable way the closure element to the optical cable comprises attaching the closure element by using at least one fastener to detachably attach the closure element to the sheath of the optical cable.

3. The method of claim 2, further comprising using the at least one fastener to secure the protection tube to the sheath of the optical cable.

4. The method of claim 1, wherein extracting a segment of at least one optical fiber unit from the optical cable through said opening comprises:

providing a further opening in the sheath of the optical cable in a position downstream of said opening to access the optical fiber units contained in the optical cable;

cutting the at least one optical fiber unit in correspondence of said further opening; and extracting from the opening a portion of the at least one optical fiber unit between said opening and said further opening.

5. The method of claim 1, wherein bringing the free end of the extracted segment of optical fiber unit in correspondence of a connection point of a user device comprises inserting the extracted segment of optical fiber unit into a user conduit.

6. The method of claim 1, further comprising inserting an end portion of the protection tube proximal to the free end of the extracted segment of the optical fiber unit into the user conduit.

7. The method of claim 6, further comprising detachably securing the user conduit to the sheath of the optical cable.

8. The method of claim 1, wherein said protection tube is a flexible material, polytetrafluoroethylene or polybutylterephthalate.

9. The method of claim 1, wherein the protection tube has an outer diameter of about 10% to about 20%, of the inner diameter of the sheath of the optical cable.

10. The method of claim 9, wherein the protection tube has an outer diameter of about 12% to about 17% of the inner diameter of the sheath of the optical cable.

* * * * *